(12) United States Patent
Hagström et al.

(10) Patent No.: US 12,767,483 B2
(45) Date of Patent: Oct. 20, 2026

(54) GENERATION OF CONTROL SIGNALS

(71) Applicant: KONE Corporation, Helsinki (FI)

(72) Inventors: Emil Hagström, Helsinki (FI); Juha-Matti Kuusinen, Helsinki (FI); Simo Mäkimattila, Helsinki (FI)

(73) Assignee: KONE Corporation, Helsinki (FI)

(*) Notice: Subject to any disclaimer, the term of this patent is extended or adjusted under 35 U.S.C. 154(b) by 1085 days.

(21) Appl. No.: 17/879,582

(22) Filed: Aug. 2, 2022

(65) Prior Publication Data

US 2022/0363511 A1 Nov. 17, 2022

Related U.S. Application Data

(63) Continuation of application No. PCT/FI2020/050063, filed on Feb. 3, 2020.

(51) Int. Cl.
*B66B 1/34* (2006.01)
*B66B 1/46* (2006.01)

(52) U.S. Cl.
CPC ............ *B66B 1/3461* (2013.01); *B66B 1/468* (2013.01); *B66B 2201/211* (2013.01); *B66B 2201/402* (2013.01); *B66B 2201/4638* (2013.01); *B66B 2201/4653* (2013.01)

(58) Field of Classification Search
CPC .............................. B66B 1/3461; B66B 1/468
USPC .................................................. 187/247, 391
See application file for complete search history.

(56) References Cited

U.S. PATENT DOCUMENTS

| | | | | |
|---|---|---|---|---|
| 2020/0039754 | A1* | 2/2020 | Vuorenala | G05B 19/41865 |
| 2021/0046650 | A1* | 2/2021 | Deyle | G05D 1/0214 |
| 2021/0287164 | A1* | 9/2021 | Keenan, Jr. | B66B 1/2408 |
| 2021/0365046 | A1* | 11/2021 | Sohn | B25J 11/00 |

FOREIGN PATENT DOCUMENTS

| | | | |
|---|---|---|---|
| CN | 108946350 | A | 12/2018 |
| CN | 109789997 | A | 5/2019 |
| CN | 110683435 | A | 1/2020 |
| JP | 11-147675 | A | 6/1999 |

(Continued)

OTHER PUBLICATIONS

International Search Report for PCT/FI2020/050063 (PCT/ISA/210) mailed on Nov. 16, 2020.

(Continued)

*Primary Examiner* — Erick D Glass
(74) *Attorney, Agent, or Firm* — Birch, Stewart, Kolasch & Birch, LLP

(57) ABSTRACT

A method generates, by a control system, mutually synchronized control signals to an elevator system residing in a building and to at least one mobile robot operating in the building. The method includes: receiving a service request from an external system; detecting that an accomplishment of a requested service requires a service from both the elevator system and the at least one mobile robot; generating a first control signal to the elevator system and a second control signal to the at least mobile robot, the control signals causing the elevator system and the at least one mobile robot to operate in a synchronized manner to accomplish a service. The invention also relates to a control system and a computer program product.

17 Claims, 4 Drawing Sheets

(56) References Cited

FOREIGN PATENT DOCUMENTS

| | | | |
|---|---|---|---|
| JP | 2019-1614 | A | 1/2019 |
| WO | WO 2019/073550 | A1 | 4/2019 |

OTHER PUBLICATIONS

Written Opinion of the International Searching Authority for PCT/FI2020/050063 (PCT/ISA/237) mailed on Nov. 16, 2020.
Chinese Office Action and Search Report for Chinese Application No. 202080095084.5, dated Mar. 26, 2024, with an English translation.

* cited by examiner

GENERATION OF CONTROL SIGNALS

CROSS REFERENCE TO RELATED APPLICATION

This application is a Continuation of PCT International Application No. PCT/FI2020/050063, filed on Feb. 3, 2020, all of which is hereby expressly incorporated by reference into the present application.

TECHNICAL FIELD

The invention concerns in general the technical field of building service technology. More particularly, the invention concerns a service provision by elevator system and robot system.

BACKGROUND

Elevator systems have traditionally been implemented in buildings with a plurality of floors to serve people to move within the buildings. A single building may be served with a plurality of elevator systems in order to maintain traffic flow in acceptable limits.

Lately, so called mobile self-moving robots have been integrated with elevator system to operate in the buildings. The mobile robots may e.g. take input from persons entering the building in question wherein the input may e.g. refer to an indication of their destination in the building, which may cause the mobile robot to communicate with the elevator system and to create an elevator call in response to a receipt of input from the person. Further, the mobile robot may operate as a guide to the person heading to a certain destination in the building and, thus, even travel with the person in an elevator car of the elevator system.

In addition to above in today's world, robots are integrated to a great variety of tasks and the robots are even taking responsibility of tasks traditionally performed by human being. A non-limiting example of such a task is a mail delivery service in a building. Hence, the integration of the mobile robots, which may perform tasks autonomously, increase the traffic load of elevator systems but may also cause challenges in matching human passengers and the mobile robots in the traffic flow served by the elevator system residing in the building.

In order to address the above described topics there is need to develop solutions which may optimize traffic flows originating from different systems.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

An object of the invention is to present a method, a control system and a computer program product for generating control signals.

The objects of the invention are reached by a method, a control system and a computer program product as defined by the respective independent claims.

According to a first aspect, a method for generating, by a control system, mutually synchronized control signals to an elevator system residing in a building and to at least one mobile robot operating in the building is provided, the method comprises: receiving, by the control system, a service request from an external system; detecting, by the control system, that an accomplishment of a requested service requires a service from both the elevator system and the at least one mobile robot; generating, by the control system, a first control signal to the elevator system and a second control signal to the at least mobile robot, the first control signal and the second control signal causing the elevator system and the at least one mobile robot to operate in a synchronized manner to accomplish a service requested by the external system with the service request.

For example, the service request from the external system may comprise data defining one or more characteristics of the requested service. The one or more characteristics may define at least one of: a type of the requested service; an identifier of a service provider of the requested service, a schedule to accomplish the service, a location to accomplish the requested service.

A detection that the accomplishment of the service requires the service from both the elevator system and the at least one mobile robot may be performed based on at least one of the following: the type of the service requested by the external system, the location relating to accomplishing the service.

A generation of the first control signal and the second control signal may be performed by taking into account at least one of: pending service requests of the elevator system and/or the at least one mobile robot; a service schedule based the type of the service; traffic load of the elevator system at an instant of time of the service request. For example, the generation of the first control signal and the second control signal may be delayed in response to a detection that a pending service request of the elevator system comprises data indicating at least one of: concurrent use of the elevator system with the at least one mobile robot is not allowed; concurrent use of the elevator system with the at least one mobile robot executing a predefined type of service is not allowed. Alternatively or in addition, the generation of the first control signal and the second control signal may be performed in response to a detection that the traffic load of the elevator system is below a predefined limit.

The external system may be one of: a computing system managing a transport of mail by utilizing the elevator system and the at least one mobile robot in the transport of mail in the building; a computing system managing a delivery of an ordered product by utilizing the elevator system and the at least one mobile robot in the transport of mail in the building; a computing system managing a collection of a trash pin by utilizing the elevator system and the at least one mobile robot in the transport of mail in the building.

According to a second aspect, a control system for generating mutually synchronized control signals to an elevator system residing in a building and to at least one mobile robot operating in the building is provided, the control system comprises: means for receiving a service request from an external system; means for detecting that an accomplishment of a requested service requires a service from both the elevator system and the at least one mobile robot; means for generating a first control signal to the elevator system and a second control signal to the at least mobile robot, the first control signal and the second control signal causing the elevator system and the at least one mobile robot to operate in a synchronized manner to accomplish a service requested by the external system with the service request.

For example, the service request from the external system may comprise data defining one or more characteristics of the requested service. The one or more characteristics may define at least one of: a type of the requested service; an identifier of a service provider of the requested service, a schedule to accomplish the service, a location to accomplish the requested service.

Moreover, the control system may be arranged to perform a detection that the accomplishment of the service requires the service from both the elevator system and the at least one mobile robot based on at least one of the following: the type of the service requested by the external system, the location relating to accomplishing the service.

The control system may also be arranged to perform a generation of the first control signal and the second control signal by taking into account at least one of: pending service requests of the elevator system and/or the at least one mobile robot; a service schedule based the type of the service; traffic load of the elevator system at an instant of time of the service request.

Further, the control system may be arranged to delay the generation of the first control signal and the second control signal in response to a detection that a pending service request of the elevator system comprises data indicating at least one of: concurrent use of the elevator system with the at least one mobile robot is not allowed; concurrent use of the elevator system with the at least one mobile robot executing a predefined type of service is not allowed.

The control system may e.g. be arranged to perform the generation of the first control signal and the second control signal in response to a detection that the traffic load of the elevator system is below a predefined limit.

The control system may be arranged to communicate with the external system being one of: a computing system managing a transport of mail by utilizing the elevator system and the at least one mobile robot in the transport of mail in the building; a computing system managing a delivery of an ordered product by utilizing the elevator system and the at least one mobile robot in the transport of mail in the building; a computing system managing a collection of a trash pin by utilizing the elevator system and the at least one mobile robot in the transport of mail in the building.

According to a third aspect, a computer program product for generating mutually synchronized control signals to an elevator system residing in a building and to at least one mobile robot operating in the building is provided, which computer program product, when executed by at least one processor, cause a control system to perform the method according to the first aspect described in the foregoing description.

The expression "a number of" refers herein to any positive integer starting from one, e.g. to one, two, or three.

The expression "a plurality of" refers herein to any positive integer starting from two, e.g. to two, three, or four.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features.

The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

The embodiments of the invention are illustrated by way of example, and not by way of limitation, in the figures of the accompanying drawings.

DESCRIPTION OF THE EXEMPLIFYING EMBODIMENTS

The specific examples provided in the description given below should not be construed as limiting the scope and/or the applicability of the appended claims. Lists and groups of examples provided in the description given below are not exhaustive unless otherwise explicitly stated.

Figure 1:
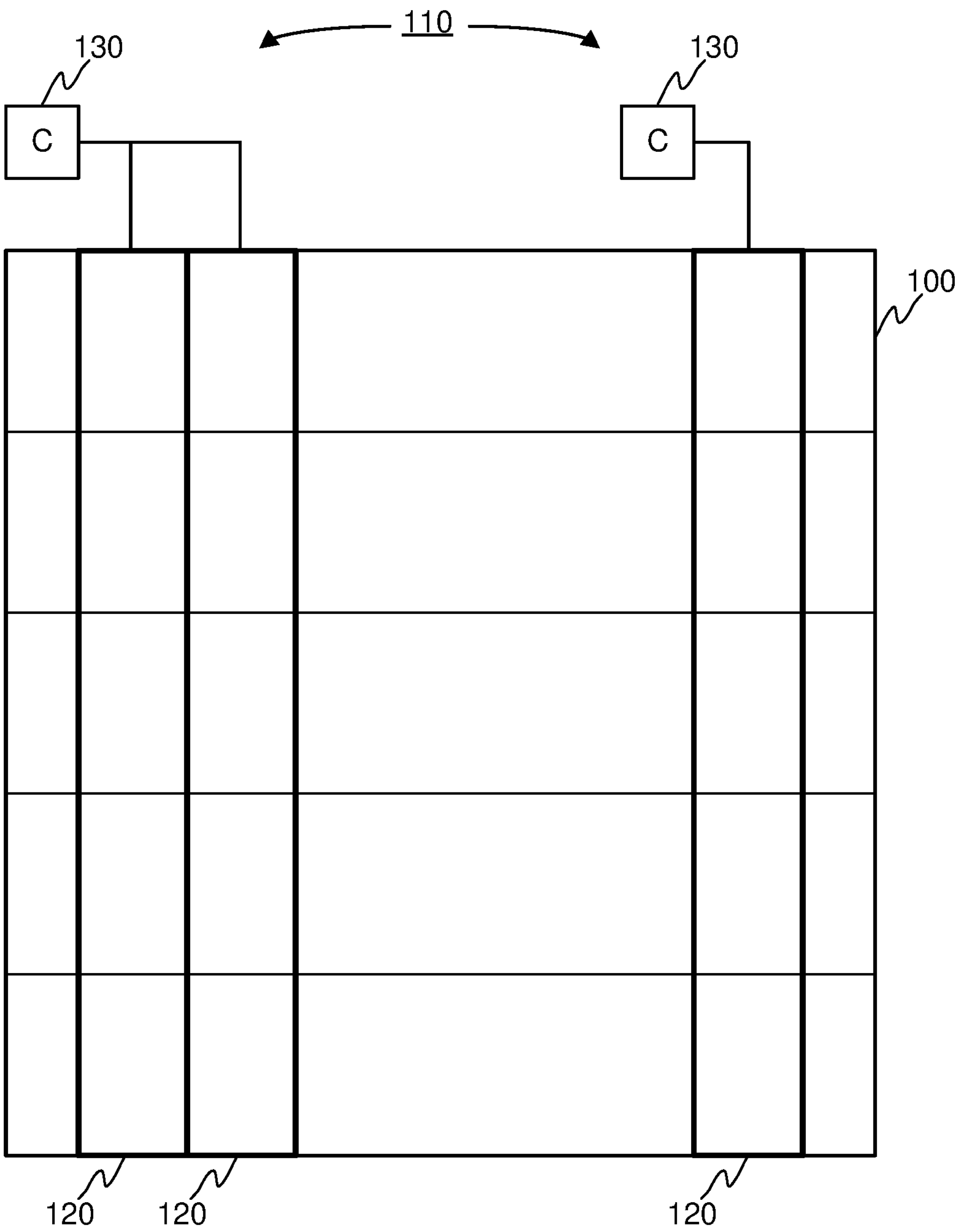
FIG. 1 illustrates schematically an example of an elevator system implementation in a building.

In the forthcoming description it is described aspect relating to an establishing a control system receiving inputs from a plurality of other systems and based on the input generating control signals to control a synchronized operation of an elevator system and at least one mobile robot arranged to operate in a building. FIG. 1 illustrates schematically an example of an elevator system 110 implementation in a building 100. The elevator system 110 implemented in the building 100 may comprise one or more elevators 120 which may be controlled through a group controller 130 or an individual controller 130 e.g. in accordance with control signals received from a control system according to example embodiments of the present invention. For sake of clarity each elevator 120 belonging to the elevator system 110 may comprise one or more elevator cars and a machinery arranged to generate necessary power to move the elevator car within its travel path, such as in a shaft. As said, the elevators 120 may serve a plurality of floors e.g. arranged substantially in a vertical direction. However, an operational direction of the elevator 120 is not necessarily vertical, but in some implementation one or more elevator cars may be arranged to travel in a horizontal direction, at least in part, between a plurality of stations (cf. floors).

Figure 2:
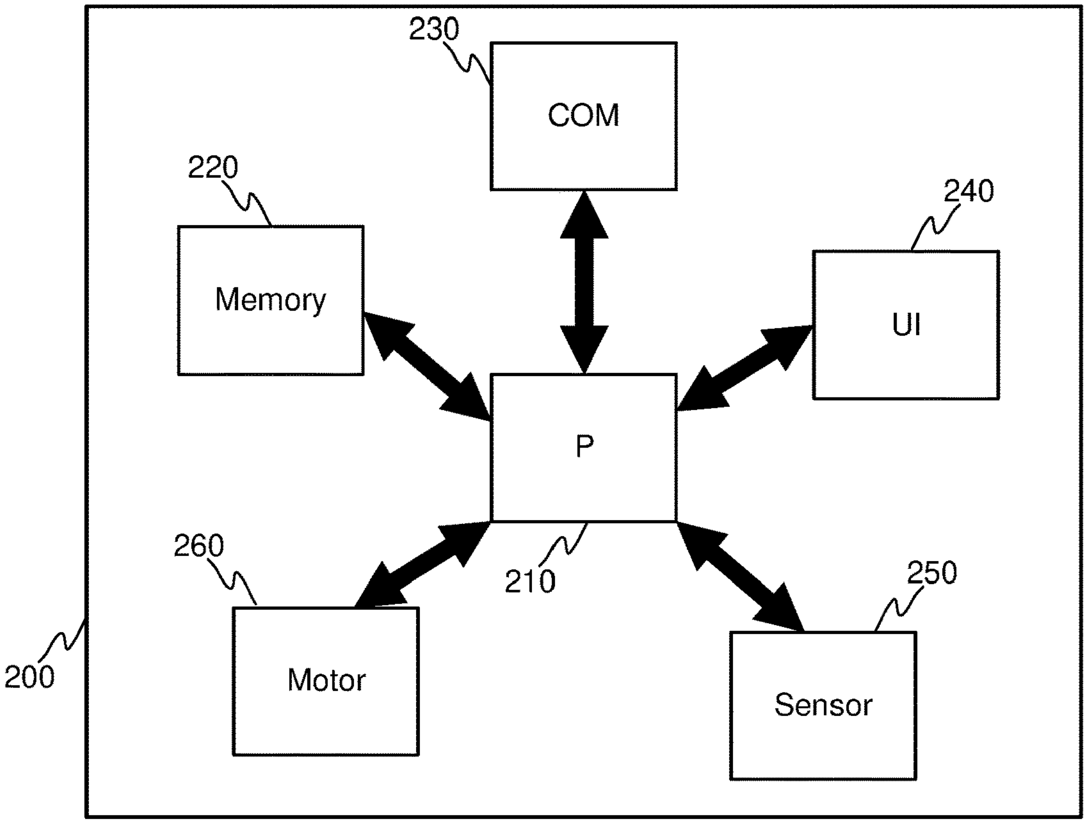
FIG. 2 illustrates schematically a mobile robot applicable in an embodiment of the invention.

The one or more mobile robot may refer device arranged to operate in a building 100 of the elevator system in autonomous or semi-autonomous manner. Such a mobile robot is schematically illustrated in FIG. 2. The mobile robot 200 may comprise at least the following entities: processing unit 210, memory unit 220, communication interface 230, user interface (UI) 240, sensor unit 250 and motor unit 260. The mentioned entities may comprise one or more operating units, e.g. one or more microprocessors or similar, one or more memories, one or more communication devices, such as modems, one or more user interface devices, one or more sensors and one or more motors. In addition to the mentioned entities the mobile robot 200 may comprise further devices and entities, such as batteries for storing energy to be used by the other entities. The entities belonging to the robot 200 may be communicatively coupled to each other with e.g. a communication bus. The processing unit 210 may be configured to control the operation of the mobile robot 200 as well as communication with any external entity, such as with other robots or other entities, as will be described in the forthcoming description. The communication may be performed e.g. in a wireless manner. The sensors belonging to the sensor unit 250 may be any applicable sensor types by means of which the mobile robot 200 may obtain information on an environment. Alternatively or in addition, the sensor unit 250 may comprise sensors enabling positioning and/or navigation within the location, such as applying an indoor positioning system. The processing unit 210 may also be configured to generate control signals to the motor unit 260 in order to make the mobile robot 200 to move. Moreover, the mobile robot 200 may comprise means enabling the robot to be mobile, such as the transport means as described earlier. The operation of the processing unit 210 may be achieved by executing portions of computer program code stored e.g. in the memory unit 220 for generating the control signals and, thus, causing the mobile robot 200 to operate in a manner as will be described. The memory unit 220 may also be used for storing obtained and received information together with any other data either permanently or temporarily.

Figure 3:
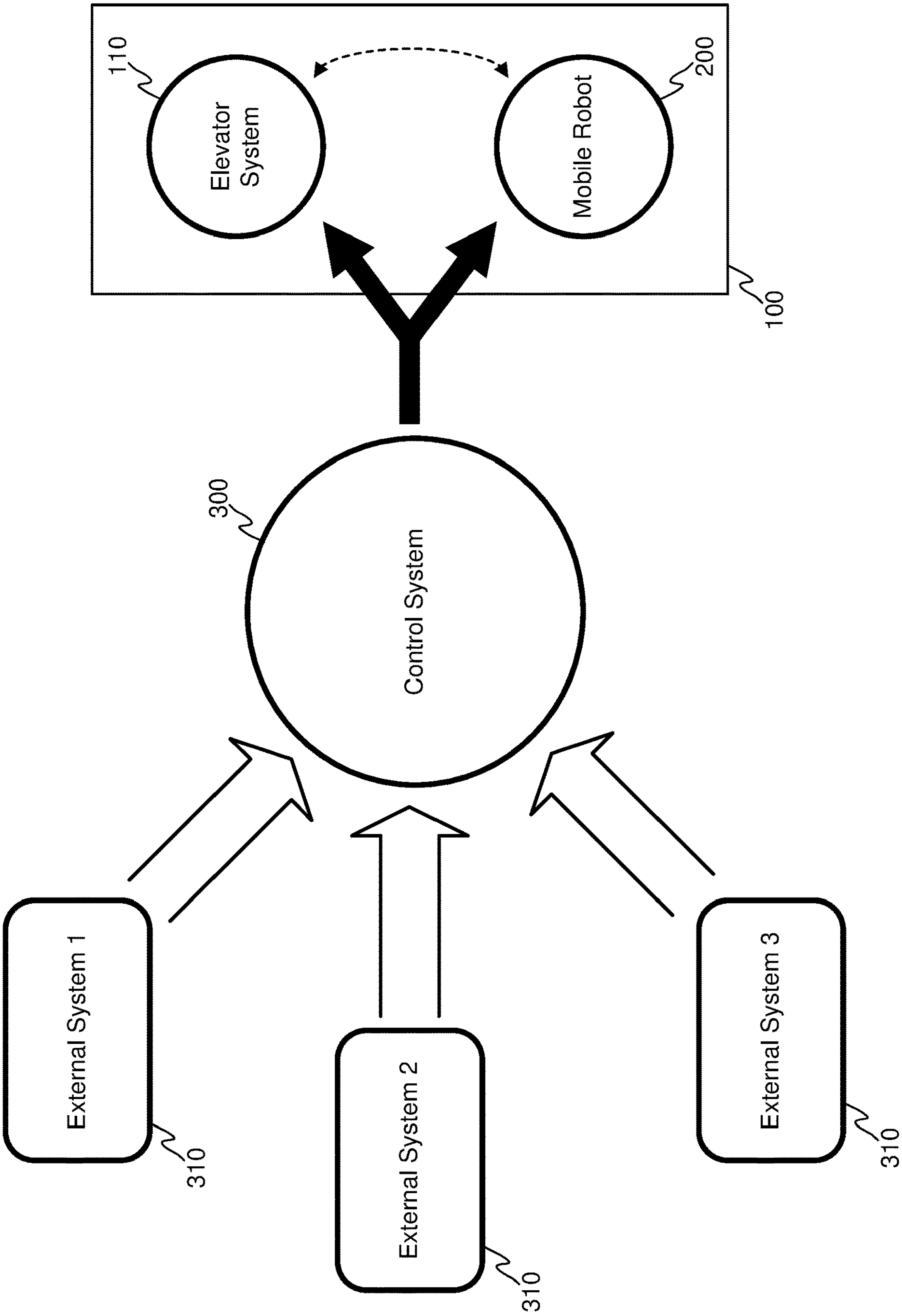
FIG. 3 illustrates schematically an environment comprising a control system according to an embodiment of the invention.

A complexity of implementing services for different parties in a building may require special attention and for that reason a control system in accordance with example embodiments may be introduced. The control system may be arranged to integrate a plurality of parties through applicable interfaces as schematically illustrated in FIG. 3. In other words, the control system 300 may be communicatively coupled to an elevator system 110 and at least one mobile robot 200 residing in a building 100, or in any other space in which they are operating in parallel. The communication connection may be established in a wired or wireless manner, such as utilizing mobile communication network for communication, between the respective entities, and through the communication interfaces of the respective entities. Furthermore, the control system 300 may be communicatively coupled to a number of external systems 310 providing services to the building 100 in question. The number of the external systems 310 is not limited to three as schematically illustrated in FIG. 3 but may vary being one or more. The external system 310 may refer to any such entity which interacts with the building 100 in one manner or another. For example, the entity may be a device or a system operating in the building 100 either permanently or temporary or the entity may refer to such an external entity which provides services either directly or indirectly in the building. In view of the present invention the external system 310 providing services in the building is such that it may generate service requests requiring service from both the elevator system 110 and the at least one mobile robot 200. For sake of clarity, the communication with the mobile robots 200 may be implemented either directly with the mobile robots 200 or through a robot system being communicatively coupled to the control system 300 and to the at least one mobile robot 200. For the purpose of describing aspects of the present invention it is hereby assumed that that the communication is performed directly with the mobile robots 200. As non-limiting examples of the external systems 310 causing interaction with one or more entities in the building 100 may be mentioned the following:

- Mail and parcel services in which mobile robots 200 may be involved in delivering mails and/or parcels in the building when delivered by a transport company in the building 100. The same may apply with collecting the out-going mail and parcel from the building. The external system 310 may be a computing system managed by the transport company (cf. e.g. post) which may provide information on the delivery/pick-up to the control system 300. The delivery, and pick-up, of mail and parcel may require services from both the mobile robot 200 and the elevator system 110.
- Shop delivery service in which mobile robots 200 may pick up a delivery of a product e.g. from a main entrance and deliver the product to a destination in the building 100. The external system 310 may be a computing system managed by the store (cf. e.g. post) which may provide information on the delivery of an ordered product to the control system 300. The delivery, and pick-up, of mail and parcel may require services from both the mobile robot 200 and the elevator system 110.
- Trash collection service in which mobile robots 200 are involved in collecting trash pins out from the building 100. The collection may occur in response to an external trigger signal, such as received from a trash bin e.g. through a computing system configured to monitor e.g. a filling level of trash bins in the building 100. The delivery, and pick-up, of mail and parcel may require services from both the mobile robot 200 and the elevator system 110.

As mentioned, the above given examples are non-limiting application areas in which an accomplishment of the service may require use of both the elevator system 110 and the mobile robots 200. The mentioned external systems 310, or at least parts of them, may e.g. be implemented as a stand-alone single server or a distributed computing environment, or as a cloud computing.

Figure 4:
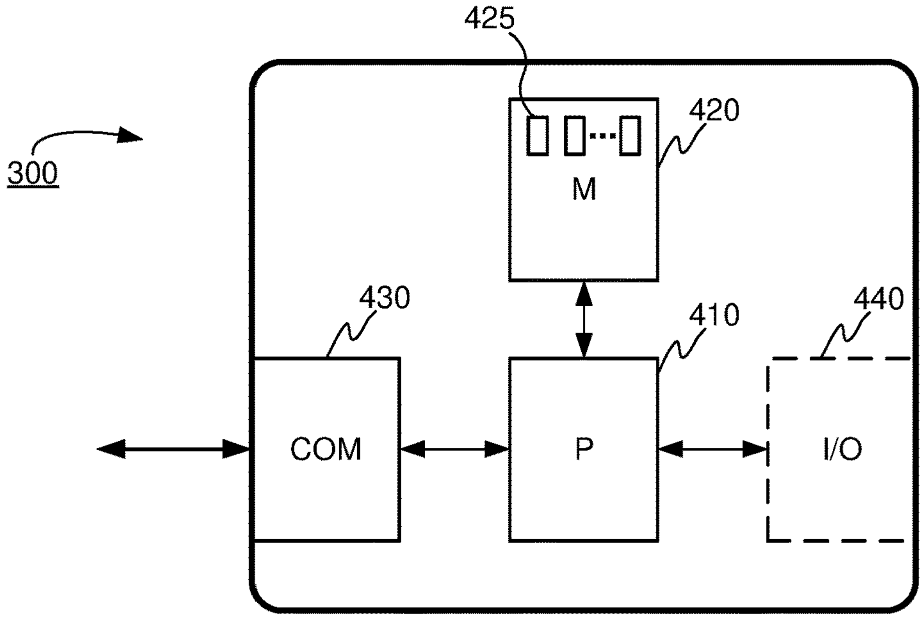
FIG. 4 illustrates schematically a control system according to an embodiment of the invention.

The control system 300 as referred in FIG. 3 is schematically illustrated in FIG. 4 in more detail. FIG. 4 illustrates schematically as a block diagram an example of the control system 300 applicable in the environment as described. The block diagram of FIG. 4 depicts some components of a device that may be employed to implement the control system 300. The device may comprise a processor 410 and a memory 420. The memory 420 may store data and computer program code 425. The device may further comprise communication means 430 for wired or wireless communication with other apparatuses or systems, such as with the elevator system 110, the at least one mobile robot 200 and a number of external systems 310. The communication means 430 may refer to applicable modems or communication interfaces implementing applied communication protocols for enabling a communication with the other devices and/or systems. Additionally, the device may comprise user I/O (input/output) components 440 that may be arranged, together with the processor 410 and a portion of the computer program code 425, to provide the user interface for receiving input from a user and/or providing output to the user. In particular, the user I/O components 440 may include user input means, such as one or more keys or buttons, a keyboard, a touchscreen or a touchpad, etc. The user I/O components 440 may include output means, such as a display or a touchscreen. The components of the device may be communicatively coupled to each other via a communication bus that enables transfer of data and control information between the components.

The memory 420 and a portion of the computer program code 425 stored therein may be further arranged, with the processor 410, to cause the device, i.e. the control system 300, to perform a method according to an example embodiment as described in the forthcoming description. The processor 410 may be configured to read from and write to the memory 420. Although the processor 410 is depicted as a respective single component, it may be implemented as respective one or more separate processing components. Similarly, although the memory 420 is depicted as a respective single component, it may be implemented as respective one or more separate components, some or all of which may be integrated/removable and/or may provide permanent/semi-permanent/dynamic/cached storage.

The computer program code 425 may comprise computer-executable instructions that implement functions that correspond to steps of the method as will be described when loaded into the processor 410. As an example, the computer program code 425 may include a computer program consisting of one or more sequences of one or more instructions. The processor 410 is able to load and execute the computer program by reading the one or more sequences of one or more instructions included therein from the memory 420. The one or more sequences of one or more instructions may be configured to, when executed by the processor 410, cause the device to perform the method according to the example embodiment. Hence, the device may comprise at least one processor 410 and at least one memory 420 including the computer program code 425 for one or more programs, the at least one memory 420 and the computer pro-gram code 425 configured to, with the at least one processor 410, cause the device to perform the method to be described in the forthcoming description.

The computer program code 425 may be provided e.g. a computer program product comprising at least one computer-readable non-transitory medium having the computer program code 425 stored thereon, which computer program code 425, when executed by the processor 410, causes the device to perform the method according to the example embodiment. The computer-readable non-transitory medium may comprise a memory device or a record medium such as a CD-ROM, a DVD, a Blu-ray disc or another article of manufacture that tangibly embodies the computer program. As another example, the computer program may be provided as a signal configured to reliably transfer the computer program.

In FIG. 4 the control system 300 is illustrated schematically as a single device. However, the control system 300 in accordance with the invention is not limited to such an implementation only, but the implementation may be arranged as a distributed computing environment comprising a plurality of devices arranged to cooperate in a manner implementing a method as will be described in the forthcoming description. The control system 300 may also be implemented in a cloud computing environment having an interface with other entities, such as cloud computing environments of external systems 310 and/or elevator system 110 and/or mobile robot. In other words, the control system 300 shall be understood as a decision-making function, such as an algorithm or respective functionality, in the described manner. In some embodiments it may be a computer program product executed in a distributed manner between the mobile robot 200 and the elevator system 110 represented e.g. by at least one elevator controller of the elevator system 110.

Figure 5:
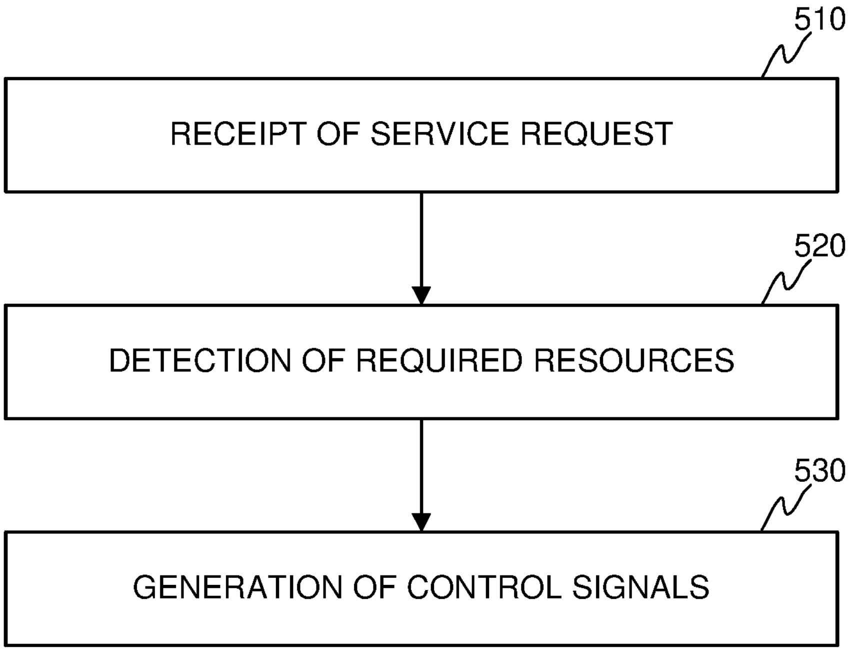
FIG. 5 illustrates schematically a method according to an embodiment of the invention.

Next, at least some aspects of a method in accordance with some example embodiments are discussed by referring to FIG. 5. The method is described from the control system point of view wherein at least one aim of the control system 300 is to generate mutually synchronized control signals to an elevator system 110 residing in a building 100 and to at least one mobile robot 200 operating at least in part in the building 100. First, the control system 300 may receive 510 one or more service requests from at least one external system 310. The service request, or the service requests, received from the at least one external system 310 may in accordance with an example embodiment comprise data defining one or more characteristics of the requested service. For example, the one or more characteristics may indicate a type of the requested service either directly or indirectly, an identifier of the service provider, a schedule to accomplish the service, a location to accomplish the requested service, and so on.

Next, the control system 300 may be arranged to analyse the data in the service request and based on at least one predefined rule the control system 300 may be arranged to detect 520 required resources to accomplish the requested service. More specifically, the control system 300 may be arranged to detect that 520 an accomplishment of the requested service requires a service from both the elevator system 110 and the at least one mobile robot 200. For example, the detection 520 may be performed, based on the received service request, by detecting that at least one mobile robot 200 is needed to accomplish the requested service and the accomplishment of the service requires transporting the at least one mobile robot 200 from one floor to another in the building 100 wherein a transport of the at least one mobile robot 200 may be performed with the elevator system 110 residing in the building 100. The present invention does not limit the transport of the at least one mobile robot 200 to using only one elevator belonging to the elevator system 110, but the control system 300 may be arranged to select a suitable combination of the elevators for arranging the transport of the at least one mobile robot 200 from one floor to another. For example, the detection may be based on the identifier of the requested task or data indication of a location relating to accomplishing the requested service, such as a route point of the mobile robot 200 or a location of executing the requested task.

In response to the detection 520 by the control system 300 that the accomplishment of the service as requested requires service from both the elevator system 110 and the at least one mobile robot 200, the control system 300 may be arranged to generate 530 a first control signal to the elevator system 110 and a second control signal to the at least mobile robot 200. The first and the second control signals are generated so that by means of the elevator system 110 and the at least one mobile robot 200 may be caused to operate in a synchronized manner to accomplish a service requested by the at least one external system 310 with the service request.

Figure 6:
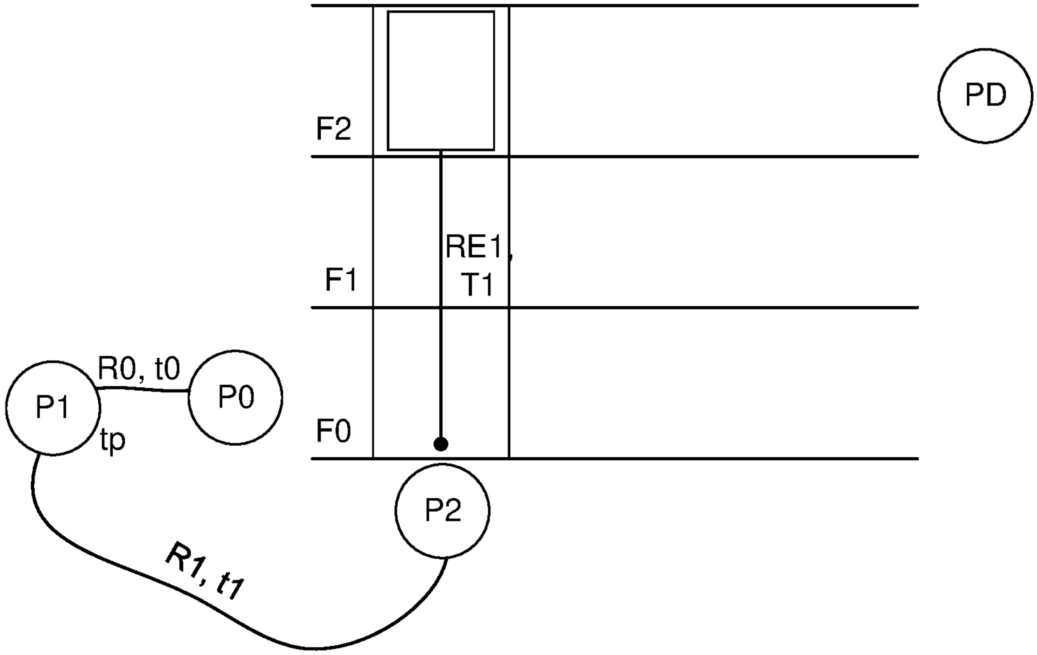
FIG. 6 illustrates schematically a scenario for implementing a service according to an embodiment of the invention.

As a non-limiting example of achieving a synchronized operation between the elevator system 110 and the at least one mobile robot 200 it is now referred to FIG. 6 illustrating schematically a possible scenario of implanting a service with both the elevator system 110 and the at least one mobile robot 200. It is hereby assumed that the requested service received from an external system 310 may be a delivery of mail to a destination PD in a three-floor (F0, F1, F2) building 100. The control system 300 as described may e.g. be aware of positions of the mobile robots 200 within the building 100 e.g. through an indoor positioning system providing information representing positions of the mobile robots 200. Additionally, the control system 300 may have access to an elevator controller, or to any corresponding entity, which manages elevator calls and generates control signals to serve the pending calls. Hence, the control system 300 may be aware of the traffic situation of the elevator system. For example, it may be aware of that the elevator car of the elevator system at the moment of the received service request from the external system 110 resides at floor F2 and there are no pending calls at the moment for the elevator system 110. Now, in response to the receipt of the service request the control system 300 is arranged to determine characteristics of the service requested, such as that the type of the service request is a mail delivery task and the destination for the delivery is PD in FIG. 6. Consequently, the control system 300 may select a mobile robot 200 to be assigned to the task and derive its current position P0. Additionally, since the control system 300 is arranged to be aware of that a pick-up location of the mail is P1 in the building 100, it may determine, by comparing the locations P0, P1 and PD, that not all of the locations reside in the same floor, there is needed a service also from the elevator system 110. In response to the determination, the control system 300 may be arranged to determine a time needed for move the robot from the location P0 to the pick-up location P1 via a route R0, pick-up time tp of the mail to be delivered (e.g. a standard time allocation), and then move the mobile robot 200 from the location P1 to a location P2 via a route R0 from which the mobile robot 200 may enter the elevator car. Hence, the mobile robot 200 requires a time tr=t0+tp+t1 being ready for entering the elevator car. Moreover, the control system 300 may determine, e.g. by inquiring from the elevator controller, a time the elevator system 200 needs to move the elevator car to the floor F0 to pick up the mobile robot 200. This may e.g. correspond to the time T1 needed for moving the elevator car from floor F2 to the floor F0 via a route RE1 in FIG. 6. In accordance with the non-limiting example embodiment the control system 300 may, in response to a determination of the mentioned pieces of data, generate the first control signal to the elevator system 110, such as through the elevator controller, and a second control signal to the at least one mobile robot 200. The control system 300 may include data in the generated first and second control signal which causes synchronized operation between the elevator system 110 and the mobile robot 200. The data included in the respective control signals may comprise instructions of the routes, or at least positions of at least some route points, such as a destination floor, as well as an instant of time the travel shall be initiated in order to minimize the waiting time of the mobile robot at the location P2, for example. Alternatively or in addition, the control signals for the respective entities may be determined so that the total travel time of the mobile robot 200 from the location P0 to the location PD via the mentioned route points may be minimized. Hence, the data included in the respective control signals represents actions to achieve that the total travel time of the mobile robot 200 to accomplish the requested service with help of the elevator system 110 is minimized.

The example of FIG. 6 is simplified, and further criteria may be taken into account for the generation of the first control signal and the second control signal. For example, if the elevator system 110 comprises pending elevator calls, i.e. service requests the elevator controller have received which are not yet assigned to any elevator, the pending service calls may be taken into account in a generation of the control signals. Namely, in accordance with some example embodiments the pending elevator calls may comprise further data associated to the service call. This may e.g. be user dependent rules defining preferences of a user with respect to a use of elevator system. The elevator controller may receive the rules representing the user preferences e.g. if the user is identified in a context of he/she is placing the service call to the elevator system 110. The identification of the user may e.g. be implemented by means of some automatic identification mechanism, such as face recognition with a camera solution, or by arranging e.g. a reader device in a location of the elevator system 110 wherein the user willing to use the elevator system interacts with the reader in some manner, e.g. by bringing an identification tag in a vicinity of the reader. In response to the identification of the user the elevator controller may retrieve the user preferences from data storage accessible by it and associate the user preferences with the elevator calls. For example, the user preferences may e.g. indicate that the user is not willing to travel with the mobile robot 200, or that the user does not want to travel with the mobile robot 200 executing a predefined type of task, such as transporting a trash bin. Now, if the control system 300 has received the service request requiring the use of both the elevator system 110 and the at least one mobile robot 200, the control system 300 may be arranged to inquire from the elevator controller the current status of the service calls and receive information indicating detailed information on the pending elevator calls. If there are pending elevator calls which create restrictions with respect to a travel of the mobile robot 200 in the elevator system 110, the control system may take these into account in the generation of the first control signal and the second signal to the respective systems. This may e.g. comprise postponing the use of the elevator system in the accomplishment of the service as requested. Correspondingly, if the control system 300 determines that a traffic load of the elevator system 110 exceeds a predetermined limit, e.g. in terms of a number of pending elevator calls, the control system 300 may postpone the generation of the control signals or at least define a delayed schedule for initiating an accomplishment of the service in the first and the second control signals. In other words, the aim is to schedule an execution of the service task by the mobile robot 200, and, hence, by the elevator system 110 so that it does not have a significant impact on the performance of the elevator system 110, especially if the requested service task is not time-critical.

In the foregoing description it is provided at least some aspects on the present invention in which so-called external service providers may be combined with in-house service systems i.e. with an elevator system 110 and with at least one mobile robot 200 for achieving the systems to communicate with each other so that a combined service from the elevator system 110 and the at least one mobile robot 200 may be received. In between the mentioned systems a control system 300 is established, which comprises applicable interfaces for enabling the communication with the mentioned systems whereas the control system 300 is arranged to generate synchronized control signals to the elevator system 110 and to the at least one mobile robot 200 in the various manner as described.

The specific examples provided in the description given above should not be construed as limiting the applicability and/or the interpretation of the appended claims. Lists and groups of examples provided in the description given above are not exhaustive unless otherwise explicitly stated.

What is claimed is:

1. A method for generating, by a control system, mutually synchronized control signals to an elevator system residing in a building and to at least one mobile robot operating in the building, the method comprises:

receiving, by the control system, a service request from an external system, detecting, by the control system, that an accomplishment of a requested service in the service request requires a service from both the elevator system and the at least one mobile robot, and generating, by the control system, a first control signal to the elevator system and a second control signal to the at least mobile robot, the first control signal and the second control signal causing the elevator system and the at least one mobile robot to operate in a synchronized manner to accomplish a service requested by the external system with the service request; wherein a generation of the first control signal and the second control signal is performed by taking into account at least one of: pending service requests of the elevator system and/or the at least one mobile robot; a service schedule based the type of the service; traffic load of the elevator system at an instant of time of the service request, and the generation of the first control signal and the second control signal is delayed in response to a detection that a pending service request of the elevator system comprises data indicating at least one of: concurrent use of the elevator system with the at least one mobile robot is not allowed;

concurrent use of the elevator system with the at least one mobile robot executing a predefined type of service is not allowed.

2. The method of claim 1, wherein the service request from the external system comprises data defining one or more characteristics of the requested service.

3. The method of claim 2, wherein the one or more characteristics define at least one of: a type of the requested service; an identifier of a service provider of the requested service, a schedule to accomplish the service, a location to accomplish the requested service.

4. The method of claim 1, wherein a detection that the accomplishment of the service requires the service from both the elevator system and the at least one mobile robot is performed based on at least one of the following: the type of the service requested by the external system, the location relating to accomplishing the service.

5. A non-transitory computer readable medium storing a computer program for generating mutually synchronized control signals to an elevator system residing in a building and to at least one mobile robot operating in the building, which computer program, when executed by at least one processor, cause a control system to perform the method according to claim 1.

6. The method of claim 2, wherein a detection that the accomplishment of the service requires the service from both the elevator system and the at least one mobile robot is performed based on at least one of the following: the type of the service requested by the external system, the location relating to accomplishing the service.

7. The method of claim 3, wherein a detection that the accomplishment of the service requires the service from both the elevator system and the at least one mobile robot is performed based on at least one of the following: the type of the service requested by the external system, the location relating to accomplishing the service.

8. The method of claim 2, wherein a generation of the first control signal and the second control signal is performed by taking into account at least one of: pending service requests of the elevator system and/or the at least one mobile robot; a service schedule based the type of the service; traffic load of the elevator system at an instant of time of the service request.

9. A method for generating, by a control system, mutually synchronized control signals to an elevator system residing in a building and to at least one mobile robot operating in the building, the method comprises:

receiving, by the control system, a service request from an external system, detecting, by the control system, that an accomplishment of a requested service in the service request requires a service from both the elevator system and the at least one mobile robot, and generating, by the control system, a first control signal to the elevator system and a second control signal to the at least mobile robot, the first control signal and the second control signal causing the elevator system and the at least one mobile robot to operate in a synchronized manner to accomplish a service requested by the external system with the service request; wherein a generation of the first control signal and the second control signal is performed by taking into account at least one of: pending service requests of the elevator system and/or the at least one mobile robot; a service schedule based the type of the service; traffic load of the elevator system at an instant of time of the service request, and the generation of the first control signal and the second control signal is performed in response to a detection that the traffic load of the elevator system is below a predefined limit.

10. The method of claim 1, wherein the external system is one of: a computing system managing a transport of mail by utilizing the elevator system and the at least one mobile robot in the transport of mail in the building; a computing system managing a delivery of an ordered product by utilizing the elevator system and the at least one mobile robot in the transport of mail in the building; a computing system managing a collection of a trash pin by utilizing the elevator system and the at least one mobile robot in the transport of mail in the building.

11. A control system for generating mutually synchronized control signals to an elevator system residing in a building and to at least one mobile robot operating in the building, the control system comprises:

processing circuitry configured to receive a service request from an external system, detect that an accomplishment of a requested service in the service request requires a service from both the elevator system and the at least one mobile robot, and generate a first control signal to the elevator system and a second control signal to the at least mobile robot, the first control signal and the second control signal causing the elevator system and the at least one mobile robot to operate in a synchronized manner to accomplish a service requested by the external system with the service request; wherein the control system is arranged to perform a generation of the first control signal and the second control signal by taking into account at least one of: pending service requests of the elevator system and/or the at least one mobile robot; a service schedule based the type of the service; traffic load of the elevator system at an instant of time of the service request, and the control system is arranged to delay the generation of the first control signal and the second control signal in response to a detection that a pending service request of the elevator system comprises data indicating at least one of: concurrent use of the elevator system with the at least one mobile robot is not allowed; concurrent use of the elevator system with the at least one mobile robot executing a predefined type of service is not allowed.

12. The control system of claim 11, wherein the service request from the external system comprises data defining one or more characteristics of the requested service.

13. The control system of claim 12, wherein the one or more characteristics define at least one of: a type of the requested service; an identifier of a service provider of the requested service, a schedule to accomplish the service, a location to accomplish the requested service.

14. The control system of claim 11, wherein the control system is arranged to perform a detection that the accomplishment of the service requires the service from both the elevator system and the at least one mobile robot based on at least one of the following: the type of the service requested by the external system, the location relating to accomplishing the service.

15. The control system of claim 11, wherein the control system is arranged to perform a generation of the first control signal and the second control signal by taking into account at least one of: pending service requests of the elevator system and/or the at least one mobile robot; a service schedule based the type of the service; traffic load of the elevator system at an instant of time of the service request.

16. The control system of claim 11, wherein the control system is arranged to perform the generation of the first control signal and the second control signal in response to a detection that the traffic load of the elevator system is below a predefined limit.

17. The control system of claim 11, wherein the control system is arranged to communicate with the external system being one of: a computing system managing a transport of mail by utilizing the elevator system and the at least one mobile robot in the transport of mail in the building; a computing system managing a delivery of an ordered product by utilizing the elevator system and the at least one mobile robot in the transport of mail in the building; a computing system managing a collection of a trash pin by utilizing the elevator system and the at least one mobile robot in the transport of mail in the building.

* * * * *